United States Patent [19]

Sigel

[11] Patent Number: 4,835,599

[45] Date of Patent: May 30, 1989

[54] APPARATUS AND METHOD FOR STORING AND TRANSMITTING IMAGES REPRESENTED BY LOGIC SIGNALS

[75] Inventor: Claude A. Sigel, Albuquerque, N. Mex.

[73] Assignee: Digital Equipment Corporation, Maynard, Mass.

[21] Appl. No.: 18,491

[22] Filed: Feb. 25, 1987

[51] Int. Cl.[4] .............................................. H04N 9/67
[52] U.S. Cl. ........................................ 358/30; 358/19; 358/37
[58] Field of Search ...................... 358/13, 21, 23, 135, 358/138, 30, 37

[56] References Cited

U.S. PATENT DOCUMENTS 4,531,151 7/1985 Hentschke ............................. 358/13
4,575,709 3/1986 Tomlinson ............................ 358/13

Primary Examiner—Tommy P. Chin
Attorney, Agent, or Firm—William W. Holloway; T. Carter Pledger

[57] ABSTRACT

In order to represent a color image with a reduced quantity of information, during the transformations from color parameter pixel information to luminance/chrominance information, the first of the three luminance/chrominance parameters (i.e., the luminance) is determined for each pixel point. The two remaining luminance/chrominance parameters are determined for a predetermined pixel subarray. The luminance/chrominance subarray parameters are determined by calculating the remaining luminance/chrominance parameters for the pixel array. The remaining luminance/chrominance parameters are then determined for each pixel subarray location by calculating a weighted average of the parameters for the pixel locations that are in the neighborhood of the subarray. Only the averaged luminace/chrominance parameters for the subarray are then stored along with the first luminance/chrominance parameters for all pixels. When the color parameter information is reconstructed, the first luminance/chrominance parameter is used for each pixel and a weighted value of the remaining luminance/chrominance parameters from the neighboring subarray pixel locations are used. A component architecture, suitable for implementing the transformation of the color parameters into luminance/chrominance parameters is described as well a component architecture for reconstructing the color parameters from the reduced luminance/chrominance parameter information.

22 Claims, 6 Drawing Sheets

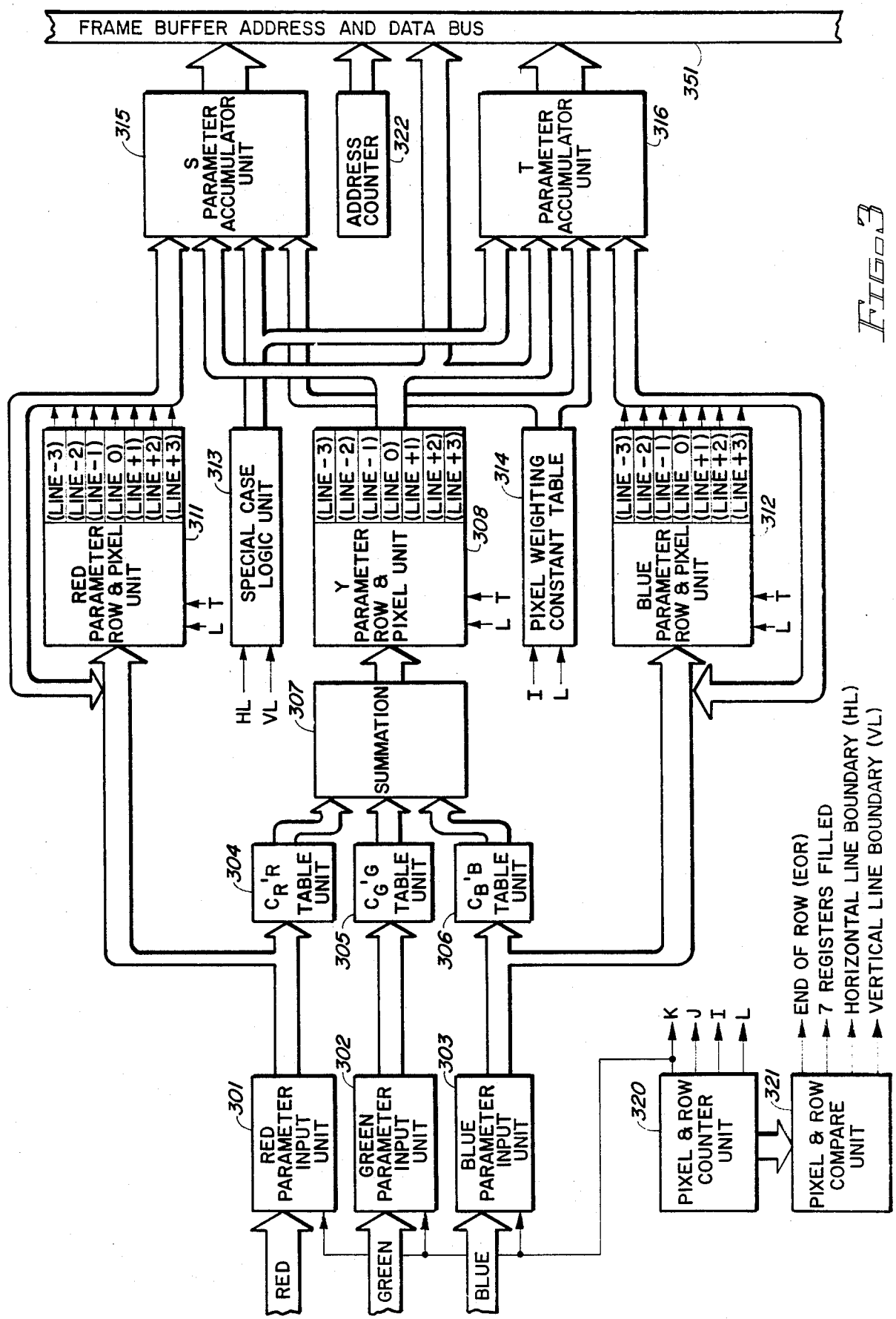

APPARATUS AND METHOD FOR STORING AND TRANSMITTING IMAGES REPRESENTED BY LOGIC SIGNALS

BACKGROUND OF THE INVENTION

1. Field of the Invention

This invention relates generally to the storage and transmission of images represented by logic signal groups and, more particularly, to a technique for substantial reduction in the number of logic signal groups required to reproduce an image without appreciable degradation of the image.

2. Description of the Related Art

In the representation of images, particularly those images to be displayed on cathode ray tubes, certain conventions have been instituted to insure compatibility of display systems. For example, an image can be represented by a two dimensional array of points or pixels, such as: ($R_{xy}$, $G_{xy}$, $B_{xy}$) where:

$R_{xy}$ is the intensity of the red component at the point xy, $G_{xy}$ is the intensity of the green component at the point xy, and $B_{xy}$ is the intensity of the blue component at the point xy.

Equivalently, the image can also be represented by the array;

$$(Y_{xy}, S_{xy}, T_{xy})$$

where:

$$Y_{xy} = 0.299R_{xy} + 0.587G_{xy} + 0.114B_{xy} = C_R R_{xy} + C_G G_{xy} + C_B B_{xy}, \quad (1)$$

$$S_{xy} = R_{xy} - Y_{xy} = 0.701R_{xy} - 0.587G_{xy} - 0.114B_{xy}, \quad (2)$$

η and $$T_{xy} = B_{xy} - Y_{xy} = -0.299R_{xy} - 0.587B_{xy} + 0.884B_{xy}. \quad (3)$$

$Y_{xy}$ is typically referred to as the luminance (parameter) of a pixel location or point, while $S_{xy}$ and $T_{xy}$ are typically referred to as the chrominance parameters. In either representation, three number parameters are associated with each point.

In a medium resolution system, 512 scan lines are employed and each scan line can consist of 512 points or pixel locations. If 24 bits are assigned to identify the color composition of each pixel (the industry standard), then approximately 800 KBytes of memory locations are required to store a single image. Related to the large amount of storage required for each image is the fact that at a 9600 Baud transmission rate, the image will require roughly 80 seconds to be transmitted.

While the image pixels are stored and transmitted in the luminance/chrominance representations, the RGB color parameters must be reconstructed for each pixel location when the image is to be displayed. The reverse transformation or decoding is given by the equations:

$$R_{xy} = Y_{xy} + S_{xy} \quad (4)$$

$$G_{xy} = Y_{xy} - 0.509S_{xy} - 0.195T_{xy} \quad (5)$$

$$B_{xy} = Y_{xy} + T_{xy} \quad (6)$$

In order to reduce the size of the storage space needed to describe an image, it has been known in the related art to provide a method referring to frequently used pixel quantities in such a way as to reduce the repeated reference to these values or to encode the repeated values with shortened identifiers. These techniques have not been successful in appreciably reducing the amount of information needed to describe an image and, in addition, frequently require complex additional processing apparatus such as a full size frame buffer.

A need has therefore been felt for a technique of reducing or compressing the quantity of binary logic signals required to describe an image without serious degradation of the image. A need has also been felt for a technique for converting between the color parameter representation and the luminance/chrominance representation without lengthy computations.

FEATURES OF THE INVENTION

It is an object of the present invention to provide an improved technique for the logic signal representation and the logic signal transmission of color images.

It is a feature of the present invention to provide a representation of an image by logic signal groups that requires substantially fewer logic signal groups to represent the image.

It is another feature of the present invention to represent an image using logic signals wherein selected image points have averaged image information.

It is still further feature of the present invention to provide a second mode of image storage to permit sharply defined regions to be represented.

It is yet another feature of the present invention to provide for improved conversion of the color (RGB) representation to a luminance/chrominance (YST) representation.

It is a still further feature of the present invention to provide apparatus for the conversion between the RGB representation of an image and the YST representation without lengthy computational steps.

SUMMARY OF THE INVENTION

The aforementioned and other features are obtained, according to the present invention, by using the RGB color parameters to calculate the luminance parameter at every pixel location of the array. The two chrominance parameters are calculated for every point of the image, but the chrominance parameters are stored only for locations of a predetermined subarray. The stored chrominance parameters at the subarray locations have contributions from the parameters at neighboring locations. When the image is to be displayed, the luminance parameter at every pixel location is combined with the chrominance parameters associated with nearby subarray locations to (approximately) reconstruct the color parameters at each image pixel location. The procedure and apparatus for performing the conversion of the color parameter representation to and from the luminance/chrominance representation is described. A technique that retains small highly color saturated regions or lines for the image is disclosed.

These and other features of the present invention will be understood upon reading of the following description along with the drawings.

BRIEF DESCRIPTION OF THE DRAWINGS

FIG. 3 is a block diagram of a component architecture for transforming the red, green and blue pixel parameters into the luminance and chrominance parameters according to the present invention.

DESCRIPTION OF THE PREFERRED EMBODIMENT

1. Detailed Description of the Figures

Figure 1:
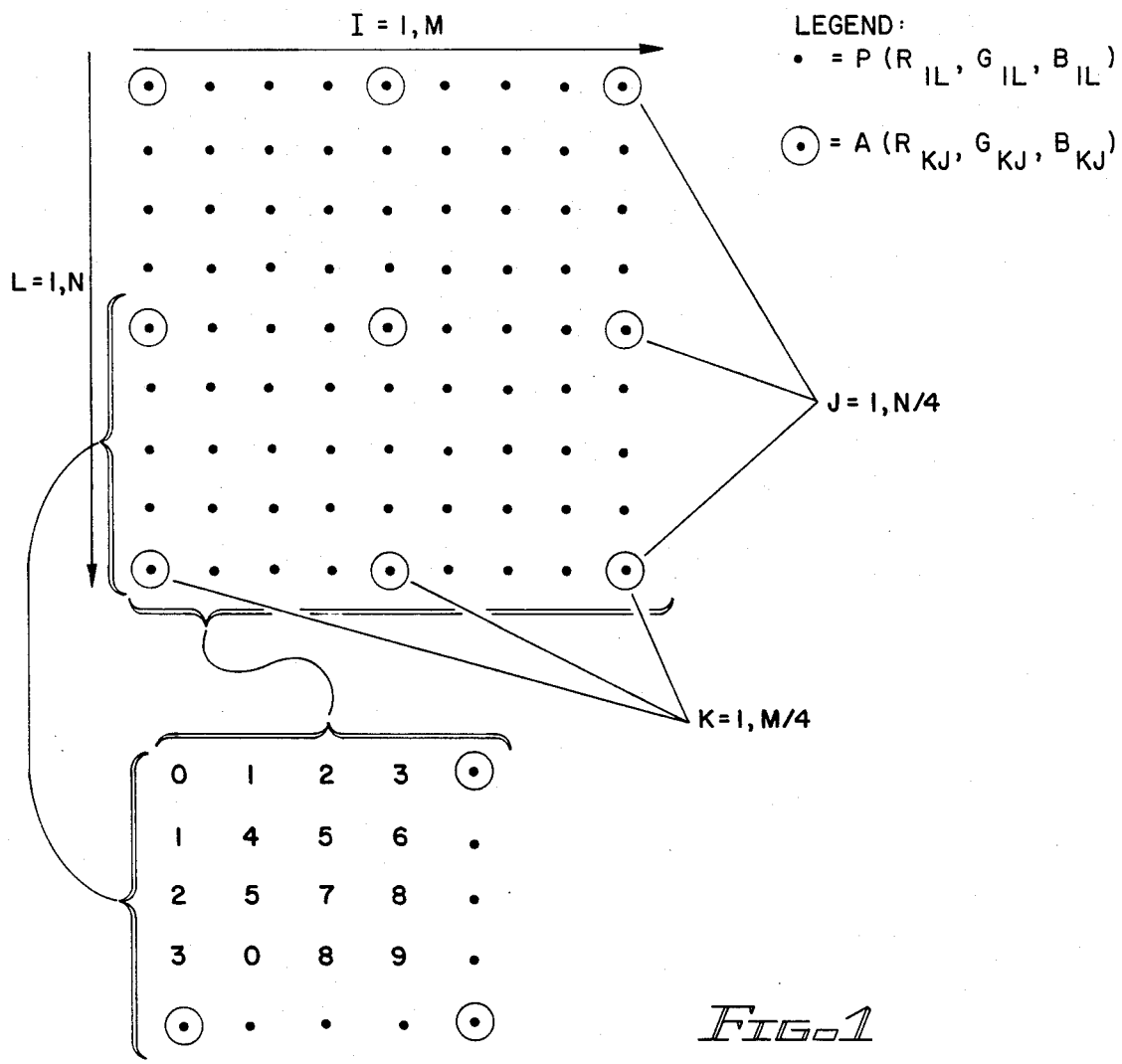
FIG. 1 is a diagram of an array of points, along with a subarray of the preferred embodiment, to be used in conjunction with the description of the operation of the invention.

Referring now to FIG. 1, the array of points represent a portion of the pixels of which an image is comprised. The indices of the pixel array are I (column) and L (row). The circles represent the subarray for which the chrominance parameters will be associated, the luminance parameters being associated with every pixel of the image array. For the subarray, the indices are represented by K (column) and J (row). In the preferred embodiment illustrated by FIG. 1, the subarray of pixel locations, designated by A, is comprised of every fourth pixel of every fourth row of the complete image array. At each point of the subarray, an average value is obtained by using a 2-dimensional Gaussian weighting function. Subarray indices, i and j respectively, can take the values from $-3$ to $+3$ with the $i=0$ and $j=0$ being the location of one of the component points A of the subarray. In the preferred embodiment, the luminance L is determined and stored for every pixel point P. However, the chrominance parameters S and T are determined for every point of the pixel array, but averaged chrominance parameters are retained only for the subarray of points A. The averaged chrominance parameters for each subarray pixel A, as shown in FIG. 1, include contributions from 49 neighboring array pixels. In the preferred embodiment, a two-dimensional Gaussian weighting procedure is used. The two-dimensional Gaussian weighting function is defined by $$W_{ij} = K \exp\{-(i^2+j^2)/2s^2\},$$

where the standard deviations is determined by causing the functional weights to fall to 1% of their value at the most remote point of the each subarray region and the coefficient K is determined by the condition that a region of constant color should have that color preserved by the transformation. This condition corresponds to $$\sum_{i=-3}^{3}\sum_{j=-3}^{3} W_{ij} = 1.$$

From these conditions $$W_{ij} = 0.0656 \exp\{-0.195(i^2+j^2)\}.$$

In order to determine the chromatic values at subarray point A, $S_A$ and $T_A$ can be calculated in the following manner.

$$S_A = \sum_{i=-3}^{3}\sum_{j=-3}^{3}(W_{ij} S_{ij})$$

$$T_A = \sum_{i=-3}^{3}\sum_{j=-3}^{3}(W_{ij} T_{ij})$$

where the summations are taken over the 49 pixels of the associated region.

Each determination of the luminance and the chrominance involves three multiplications and two additions. In the preferred embodiments, the color parameters are 8 bit signal groups. The signal groups can therefore take on a maximum of 256 values. Look-up tables (i.e., random access memories) with the results of the multiplication operations in addressable storage locations can be used to expedite the calculation. In the transformations from the RGB (red, green, blue) parameters to the luminance/chrominance values, five constants are involved as indicated by the equations. Referring to the expanded area of FIG. 1, because of symmetry, only 10 weighting factor constants are required. Therefore, any multiplication operation can be avoided by using 15 256 address look-up tables (i.e., for the weighting constants and the transformation constants).

Referring again to FIG. 1, the notation convention is illustrated where the pixel columns are labeled with an I, while the piexel rows are labeled with an L. The subarray points (A) use K to designate the columns and J to designate the rows.

Figure 2:
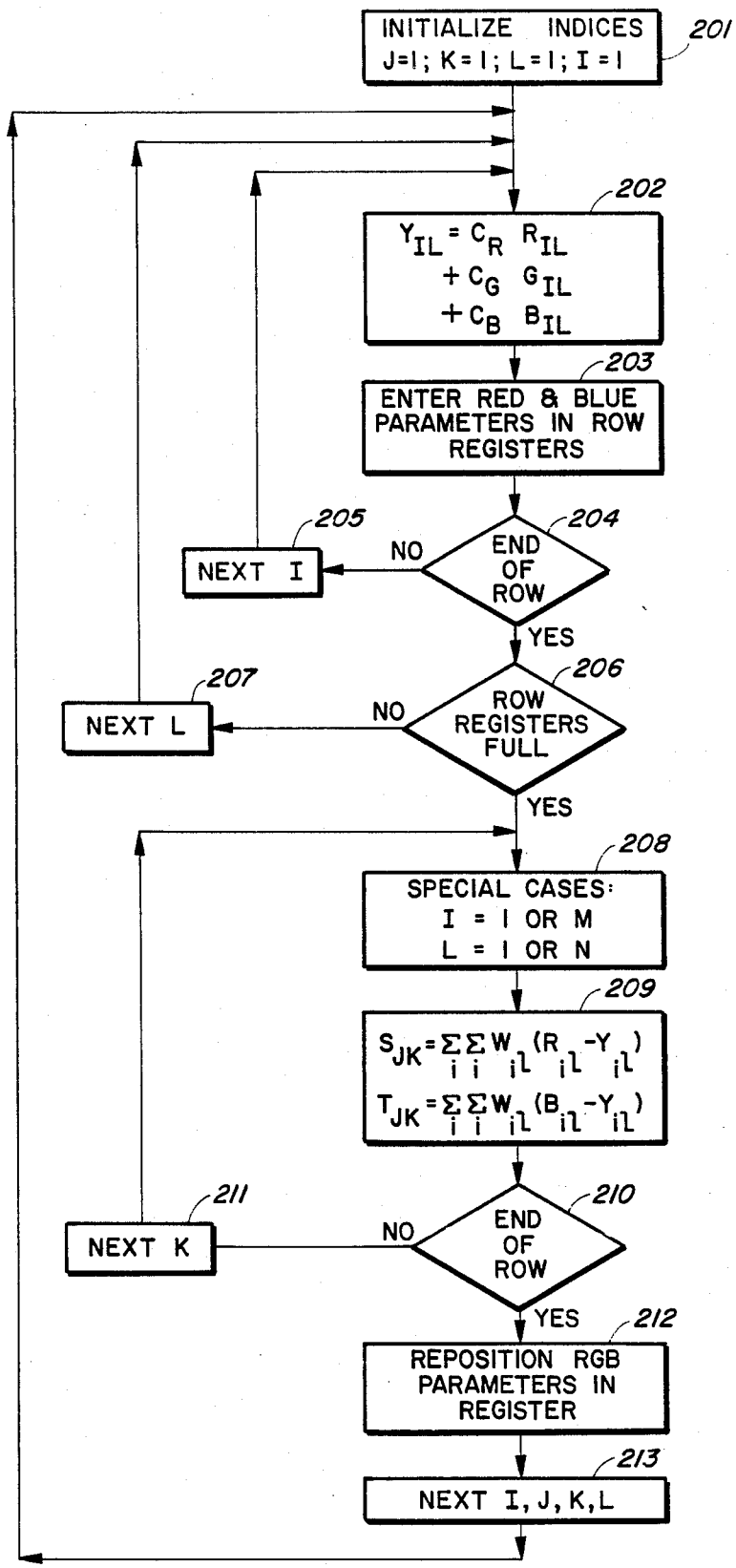
FIG. 2 is a flow diagram illustrating how the red, green and blue parameters are transformed into luminance and chrominance parameters according to the present invention.

Referring next to FIG. 2, an algorithm that performs the transformation from the RGB (red, green, blue) parameters to the luminance/chrominance (YST) parameters is shown. In the preferred embodiment, the availability of signal image pixels is in the order that the pixels are typically displayed (i.e., on a cathode ray tube or CRT), scanning in the same direction across consecutive rows. For each image, the indices are initialized so that the first pixel column (I=1), the first pixel row (L=1), the first pixel subarray column (K=1) and the first pixel subarray row (J=1) are addressed. For the addressed pixel, the luminance parameter for each point is computed in step 202. The luminance parameter value and the red and blue pixel parameters for that pixel location are each entered in an associated shift register in step 203. The shift registers include seven rows, each row having 512 byte positions (i.e., the number of pixels per row in the image). Then, in step 204, a determination is made whether the end of the image row has been reached. If the end of the image row has not been reached, then the column index (I) is incremented in step 205 and the loop is continued until the end of the row is reached in step 204. When the comparison of step 204 yields a positive result, then a comparison is made to determine whether the seven rows of the shift register are filled. When this comparison is not true, the next row of image pixels is addressed, the luminance parameters are determined and the parameters are entered in the next row of the shift register. This process loop is continued until the shift registers are filled. When this condition is true, the comparison of step 206 will yield a positive result and the determination is made in step 208 if the boundaries of the image pixel array have values that are stored in the registers. The boundaries must be treated with a special algorithm because the full complement of pixel location is not available for subarray locations on the subarray boundary. For the general (i.e., non-boundary) situation, the luminance parameters $Y_{IL}$, R(red parameter)$_{IL}$ and B(blue parameter)$_{IL}$ are in corresponding shift register positions and the chrominance parameters $S_{KJ}$ and $T_{KJ}$ for the subarray point can be determined by calculating the pixel chrominance parameters for each array location and by weighting and summing these parameters for association with this subarray point. A test is then made in step 210 whether the previous computations were for the last subarray point in the row. When the computations were not for the last subarray point of the row, then the K index is incremented in step 211, and the same computations can be performed on the next sequential subarray point of the row. When computations for the last subarray point of the row have been performed, then comparison of step 210 will provide a true result and the registers storing the $R_{IL}$ and the $B_{IL}$ parameters will shift the earliest stored three rows from the shift register in such a manner that newly stored parameters will be symmetrically placed with respect to the next subarray rows. This shifting is performed in step 212, and in step 213, the I, J, K and L indices are all set and the procedure returned to step 202. The procedure will continue until the step 208 determines that the pixel array has been completely processed and initiates the appropriate procedure, e.g., begins processing the next image.

Referring next to FIG. 3, the apparatus for implementing the algorithm illustrated in FIG. 2 is shown. Color parameter input units 301, 302, and 303 (typically latch circuits) receive the image pixel red, green and blue parameters, respectively. The output signals from color parameter input units 301, 302 and 303 are applied to $C_R R$ table unit 304, to $C_G G$ table unit 305 and to $C_B B$ table unit 306 respectively. The output signals from the table unit 304, 305 and 306 are the contributions to the luminance Y from the pixel color components at that image location. The contributions are combined in summation unit 307 (c.f. step 202 in FIG. 2). The red parameter at the pixel point is stored in red parameter row and pixel unit 311, the blue parameter is stored in a corresponding location in blue parameter row and pixel unit 312 and the luminance parameter from summation unit 307 is stored in a corresponding location in Y parameter row and pixel unit 308 (c.f. step 203 in FIG. 2). The luminance parameter is preserved for all pixel locations so that the output signals from unit 308 can be applied to the frame buffer and data bus 351 for storage or transmission. To determine the chrominance S parameter at the subarray locations, the S parameter must be determined for all the pixels of the region of the subarray point, and the resulting quantity weighted by the two-dimensional Gaussian weighting function of each pixel of the subarray point. The contribution of each region pixel is determined by applying the pixel chrominance S parameter to the table that has, in a location corresponding to the location relative to the associated subarray point, the corresponding weighted parameter stored in pixel weighting constant table 314. The subarray region weighted chrominance S parameters are summed in S parameter accumulation unit 315. A similar procedure is implemented in T parameter accumulation units 316. The output signals from the parameter accumulation units 315 and 316 are applied to frame buffer address and data buffer 351 at a pixel address determined by address counter 322. Special case logic unit 313 controls the chrominance parameter determination for the boundary locations of the subarray points where, because of the location on the array boundary, the full region of neighboring pixel locations is not available. The special case logic unit 313 can, for example, insert mid-range parameter values for the missing location parameter values, or the special case logic can multiply the available parameter values by a weighting constant, a procedure that can be equivalent to assuming that the the available parameter values represent a suitably weighted average value for the unavailable parameter values. The pixel and row counter unit 320 controls the synchronization of the transformation (or encoding) unit and the pixel and row compare unit 321 provides the decision apparatus used in steps 204, 206 and 210 of FIG. 2. This unit provides the control for entering new rows of color parameters when a row of subarray computations is complete. Parameter units 311, 312 and 308 can include shift registers and are adapted to store pixel parameters for seven rows of pixels. Because the shift registers store pixel parameters in corresponding register locations, the requisite data are simultaneously available in S parameter accumulator unit 315 and T parameter accumulator unit 316.

Figure 4:
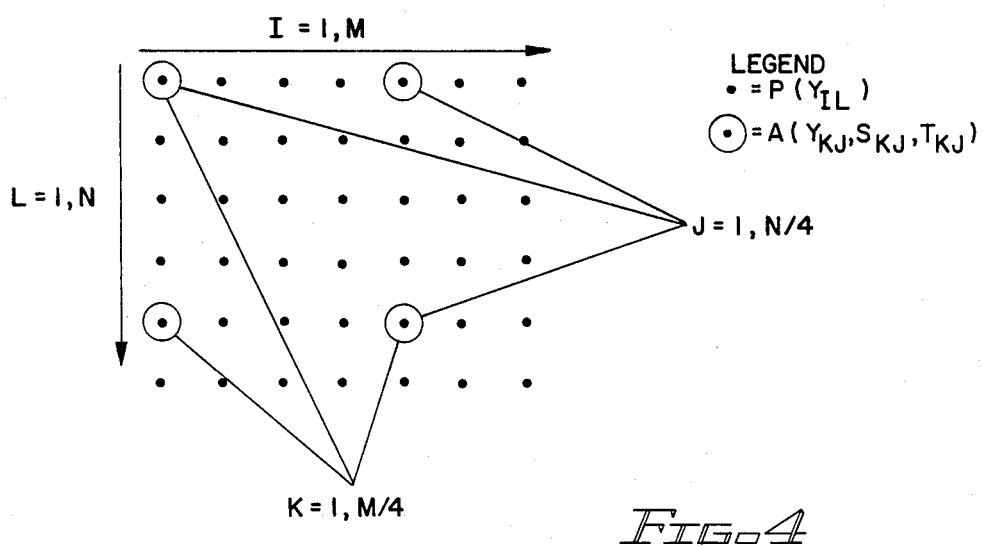
FIG. 4 is a pixel diagram used in describing how the red, green and blue parameters are recovered from the luminance and reduced set of chrominance parameters according to the present invention.

Referring next to FIG. 4, the process for recovering the color (RGB) from the encoded luminance and chrominance (YST) parameters is illustrated. The subarray points indicated by A in FIG. 4 have luminance and chrominance values associated therewith. In addition, every pixel location has a luminance value associated therewith. At every pixel location, therefore, the luminance Y is known. The chrominance parameters can be determined from the equations:

$$S'_p = \sum_{i=1}^{2} \sum_{z=1}^{2} (W'_{il} S_{il})$$

$$T'_p = \sum_{i=1}^{2} \sum_{z=1}^{2} (W'_{il} T_{il})$$

where S' and T' indicate that these are reconstructed parameters and the weighting constant $W'_{il}$ are bilinear weighting constants. Once the chrominance values (S, T) have been reconstructed for each pixel location, then equations 4, 5 and 6 can be used to reconstruct the pixel color parameters. In practice, four situations are encountered when reconstructing the chrominance parameters. In the first situation, the pixel location for which the color parameters are desired is also a subarray location. For this situation, the subarray chrominance parameters are the pixel chrominance parametets. (This procedure is designated as Case A in FIG. 5 and FIG. 6A and FIG. 6B). In the second situation, the pixel location is on a row between two subarray locations. In this situation, the pixel chrominance parameters are linear combinations of the bounding subarray point chrominance parameters. (This situation is designated as Case C in FIG. 5 and FIG. 6A and FIG. 6B). Similarly, the pixel location can be on a column between the two subarray locations and the reconstructed chrominance parameters are linear combinations of the chrominance parameters of the subarray location bounding the pixel locations. (This situation is designated as Case D in FIG. 5 and FIG. 6A and FIG. 6B). Finally, the pixel location can be none of the special categories and the reconstructed chrominance parameters will be a combination of the four subarray locations bounding the pixel locations as described in the equations above. (This situation is designated as Case B in FIG. 5 and FIG. 6A and FIG. 6B).

Figure 5:
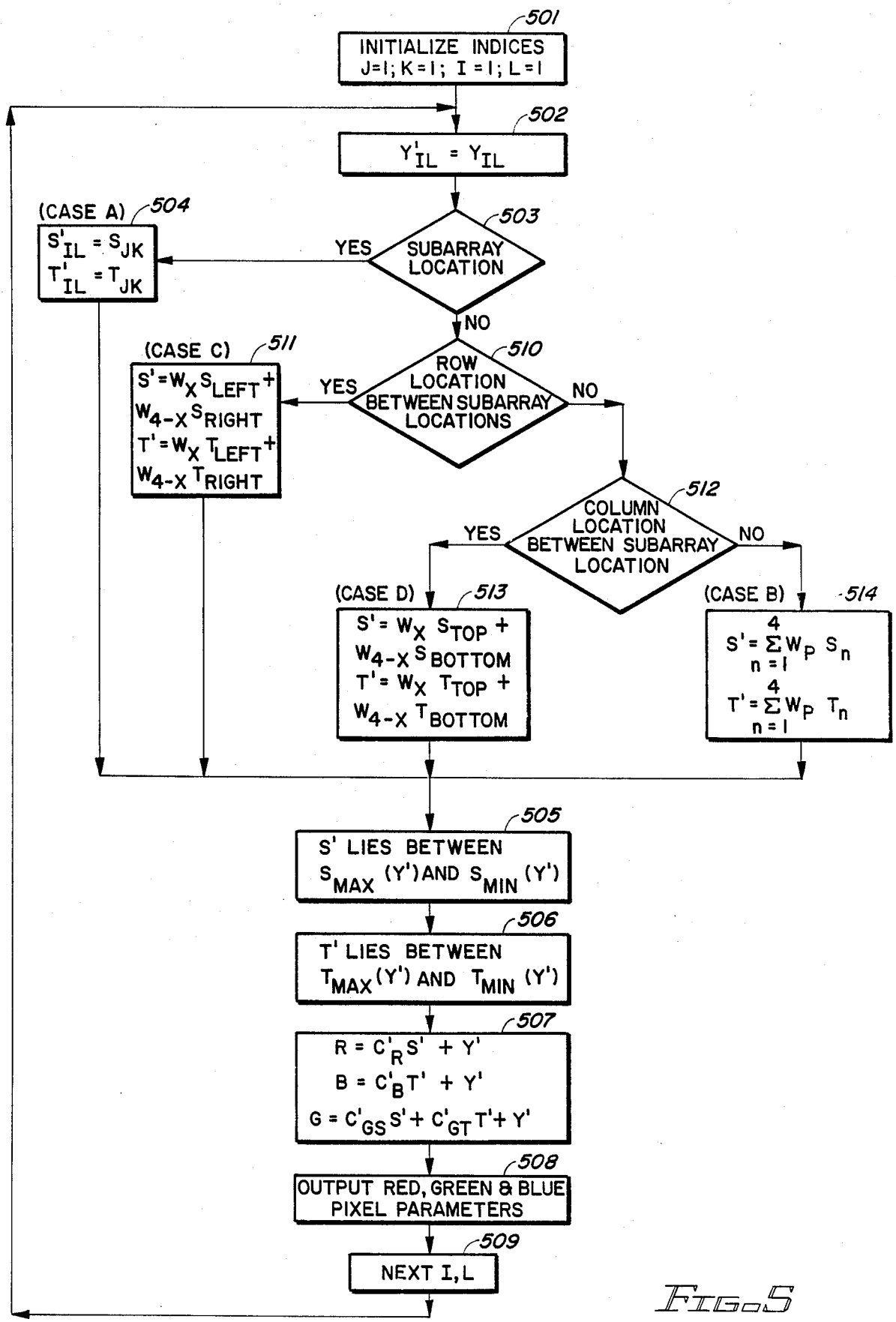
FIG. 5 is a flow diagram of the recovery of red, green and blue pixel values for the transformation from YST parameters to RGB parameters according to the present invention.

Referring next to FIG. 5, the algorithm for reconstructing the color parameters from the luminance/-chrominance parameters is illustrated. In step 501, the subarray row (J) and column (K) indices along with the pixel column (I) and row (L) indices are initialized (e.g., by entering a 1 in appropriate counters). In step 502, the luminance value $Y_{IL}$ at the current location is designated as the reconstructed luminance value $Y'_{IL}$ at the location. Next, in step 503, the determination is made whether the current pixel location is a subarray location. When the determination is made that a subarray location is currently being addressed, then the $S_{JK}$ is used as the $S'_{JK}$ and $T_{JK}$ is used as the $T'_{JK}$. Thus, for the current pixel location, Y', S' and T' are available and, in step 507, the Red', Green' and Blue' parameters can be calculated using equations 4, 5 and 6. The resulting image color parameters are provided in step 508. In step 509, the column index is incremented by 1 and the process is returned to step 502. At the end of a row, the row index is incremented by one and the column index is set equal to one in step 509. Returning to step 502, when the determination is made that the subarray location is not involved, then, in step 510, a determination is made whether the current pixel location falls on a row between subarray locations. When the current pixel location is between subarray locations on the same row, then, in step 511, the $S'_{LI}$ and the $T'_{LI}$ values are determined as a linear combination of the $S_{JK}$ parameters and the $T_{JK}$ parameters, respectively, of the two bounding subarray locations by the equations:

$$S' = W_x S_{left} + W_{4-x} S_{right}$$

$$T' = W_x T_{left} + W_{4-x} T_{right}$$

PS where x is the number of pixels from the left subarray location. The output signals from step 511 include the Y', S' and T' parameters for the current location and the color parameters (R', G', B') are calculated in step 507 and provided to the display or storage circuit in step 508. The next sequential pixel location is then designated as the current pixel location in step 509. When, in step 510, the determination is made that the current pixel location is not on a row between two subarray locations, the determination is made in step 512 whether the current pixel location is on a column between two subarray locations. When this determination is true, then the $S'_{LI}$ and the $T'_{LI}$ chrominance parameters can be calculated as a linear combination of the corresponding chrominance values of the bounding subarray points similar to equations for the pixel locations on a row bounded by subarray locations. Because the Y' S' and T' parameters are now available at the currently designated pixel location, the color parameters for the currently designated pixel can be reconstructed in step 507 and the step 509 can designate the next sequential pixel location as the current pixel location. When, in step 512, the current pixel location is not on a column between two subarray locations, then in step 514, the $S'_{LI}$ and $T'_{LI}$ chrominance values are determined, as indicated previously, by a linear combination of the $S_{JK}$ and $T_{JK}$ chrominance values of the surrounding subarray locations. $W_p$ is the approriate bilinear weighting coefficient, which depends on the relatve location of the pixel to the subarray. As a result of this computation, the Y', S' and T' parameters are available for the current location and the R', G' and B' parameters can be determined in step 507. After the R', G, and B' parameters are provided to the output apparatus, the next consecutive pixel location can be addressed and the procedure repeated. Referring to FIG. 5, steps 505 and 506 provide for a situation where, because Y' is the true luminance parameter for a point, but S' and T' are averaged parameters, the S' and T' parameter at that location can be incompatible with the Y' parameter. Knowing the Y' parameter, the allowable ranges for the S' and the T' parameters are known and the steps 505 and 506 "force" the S' and T' into the allowable range.

Figure 6A:
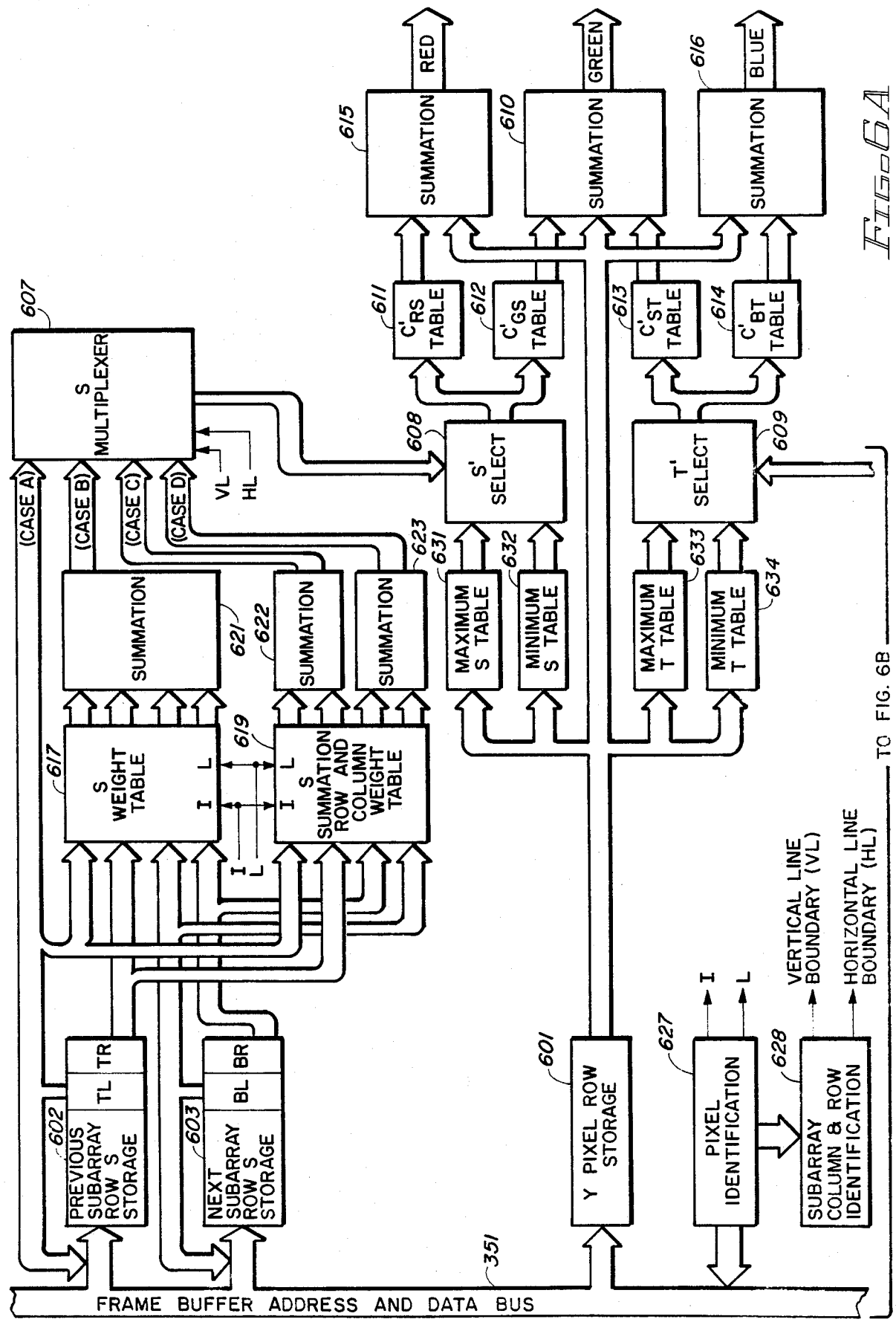
FIG. 6A and FIG. 6B together illustrate a block diagram of a component architecture implementing the recovery of red, green and blue pixel parameters from the luminance and reduced set of chrominance parameters of the flow diagram of FIG. 5.
Figure 6B:
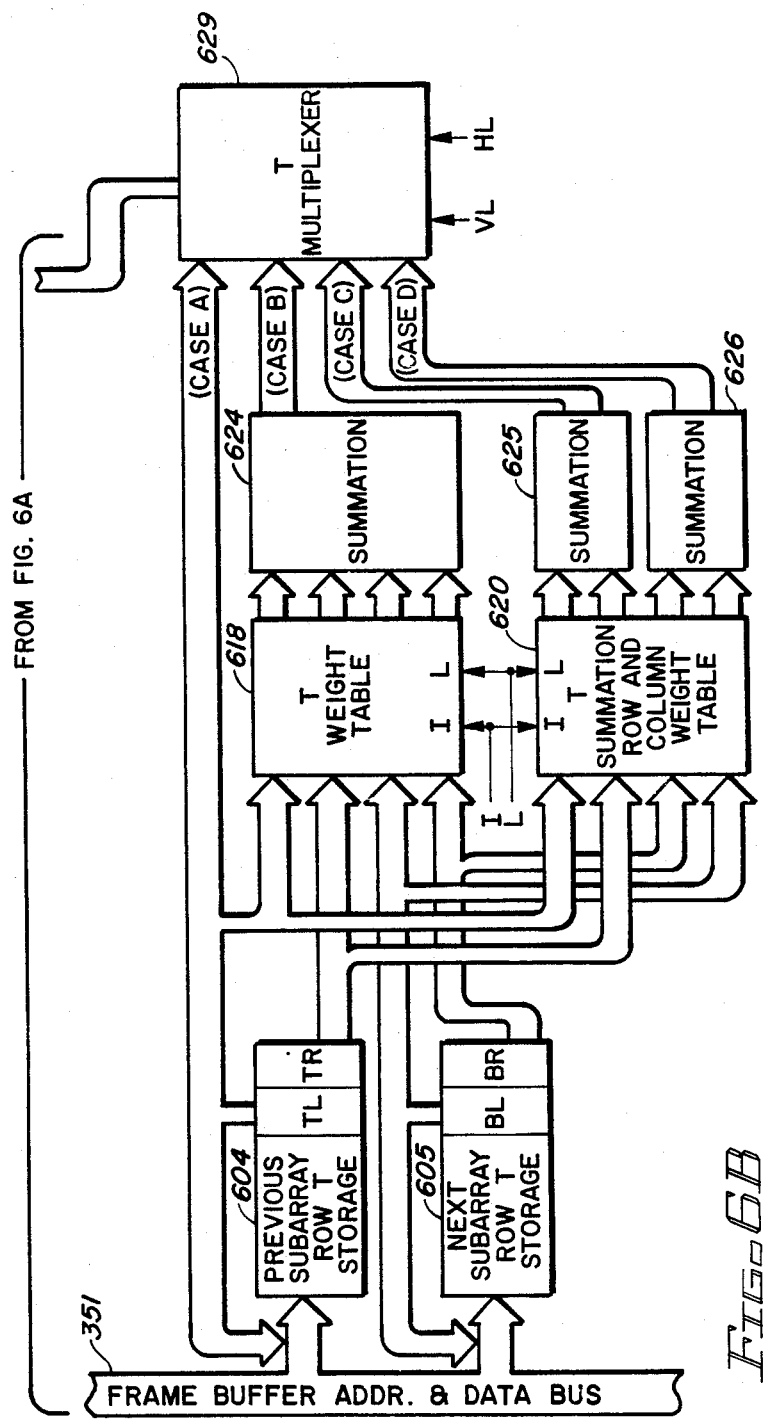

Referring next to FIG. 6A and FIG. 6B, a block diagram of apparatus capable of implementing the algorithm described by FIG. 5 is shown. The luminance and chrominance are supplied to the frame buffer address and data bus 351. In Y pixel row storage unit 601, the $Y_{LI}$ parameters for all the pixel locations of the row with the current pixel location are entered. The $S_{JK}$ parameters for the subarray row are entered in the previous subarray row S storage unit 602 while the equivalent subarray row $T_{JK}$ parameters are entered in the previous subarray row T storage unit 604. When the current pixel location coincides with a subarray location, the current subarray S parameter is located in the top left (TL) register location of S storage unit 602. This parameter, which in this situation is used as the S' chrominance select value, is applied through the S multiplexer unit 607 to the S' select unit 608. The transformation constant of the S' value needed to obtain the red color parameter is found by addressing a look-up table in the $C'_{RS}$ table unit 611 with the output of the S' register, the output of the table unit 611 being applied to summation unit 615. Simultaneously, the Y parameter, which is the Y' parameter for the current pixel location, is also applied to summation unit 615. The summation unit 615 combines the two input signals to provide the R' (reconstructed red) pixel component for the current pixel location. Similarly, when the current pixel location is a subarray pixel location, then the T chrominance parameter stored in the top left (TL) position of previous subarray row T storage unit 604 is applied through the T multiplexer unit 609 and T' select unit 609 to a look-up table in $C'_{BT}$ table unit 614. The output signal of table unit 614 is combined with the value of Y' (Y) in summation unit 616 to provide the B' (reconstructed blue) pixel value for the current pixel location. The output signal of the S' register is applied to a look-up table in the $C'_{GS}$ table unit 612 and the output signal from the T' register is applied to a look-up table in the $C'_{GT}$ table unit 613. The output signals of the table unit 612 and the table unit 613 are applied together with the Y' parameter to the summation unit 610, the output signal of the summation network 610 being the G' (reconstructed green) pixel parameter for the current pixel. (This procedure is labelled as Case A in FIG. 5 and FIG. 6A and FIG. 6B). The operation of the apparatus for the output signals of the S' register 608 and the T' register 609 is the same for computation sequences and will not be repeated below.

Referring again to FIG. 6A and FIG. 6B, the operation of Case B (cf. FIG. 5) can be understood as follows. The previous subarray row S unit 602 contains S chrominance parameters for a pixel row for which the transformation to the color parameters has already taken place. (During the activity involving the first subarray row, this row can be the current row.) The next subarray now S storage unit 603 has S chrominance parameters entered therein for the next consecutive subarray row. The current pixel row Y storage unit register 601 includes the pixel luminance parameters for the current pixel row. The S chrominance parameter stored in the top left (TL) position of register 602 is applied to a look-up table in S weight table unit 617, addressing a table determined by the relative position of the current pixel location and the subarray location associated with the TL position of storage unit 602. The second (of four) S chrominance parameters that comprises the S' chrominance parameter is located in the top right (TR) position of the storage unit 602, and this parameter is simultaneously applied to a look-up table in the S weight table unit 617, the table being addressed determined by the relative position of the current pixel and the subarray location associated with the TR position of the line store register 602. Similarly, the bottom left (BL) and bottom right (BR) locations of next row S storage unit 603 have the S chrominance parameters stored therein applied to look-up tables in S weight table unit 617 determined by the relative position of the current pixel location and the subarray locations associated with BL and BR positions. The output signals from the addressed tables of S weight table unit 617 are applied to summation unit 621 where they are combined. The resulting value is applied through S multiplexer unit 607 and stored in S' select unit 608. This procedure implements the general equation for the determination of the reconstructed S' chrominance parameter when four neighboring subarray locations contribute to the parameter as illustrated in step 514. In a similar manner, the reconstructed T' chrominance parameter is derived from the TL and TR positions of the previous subarray row T storage unit 604 and the BL and BR positions of the next subarray row T storage unit 605.

Referring once again to FIG. 6A and FIG. 6B, Case C and Case D can be understood in the following manner. In Case C, the current pixel, for which the reconstructed color parameters must be determined, lies in a row between two subarray pixel locations. Case D is similar, the difference being that the current pixel location falls on column between two subarray pixel locations. The weighting factors $W'_x$ and $W'_{4-x}$ are the same for the two situations and depend on which of the three intermediate pixel locations (i.e., between the subarray pixel locations) is designated as the current pixel location. For Case C, the current pixel location can lie between the subarray pixel locations associated with positions TL and TR of the previous subarray row S storage unit 602 or BL and BR positions of the next subarray row S storage unit 603. The appropriate two S parameters are applied to the S subarray row and column weight table unit 619, the parameters being applied to a look-up table determined by the particular intermediate pixel location. The output signals from the weight table unit 619 is combined in summation unit 622 and the resulting reconstructed parameter S' is applied through S multiplexer unit 607 to the S' select unit 608. A similar procedure involving the TL and TR positions of the previous subarray row T storage unit 604 or the BL and BR positions of the next subarray row T storage unit 605 and involving T subarray column and row weight table unit 620 and summation unit 625 provides a reconstructed T' parameter when the current pixel location lies on a row between two subarray pixel locations. For Case D, where the current pixel location lies in a column between two subarray pixel locations, the subarray pixel locations would be associated with the TL position of the previous subarray row S storage unit 602 and the BL position of the next subarray row S storage unit 603 or would be associated with the TR position of the storage unit 602 and the BR position of the storage unit 603. The S chrominance parameters of the appropriate storage units position pair is applied to look-up tables in S subarray row and column weight table 619, the particular look-up tables for the signals determined by the particular current pixel location relative to the subarray pixels. The output signals from the look-up tables are combined in summation unit 623, providing a reconstructed S' parameter and applied through S multiplexer unit 607 to S' select unit 608. The T' chrominance parameter can be determined in a similar manner utilizing the previous subarray row T storage unit 604, the next subarray row T storage unit 605, the subarray column and row weight tables unit 620, the summation unit 626 and the T multiplexer unit 608.

As discussed previously, the averaging of the chrominance parameters can result in unpermitted S' and T' parameters when compared with the Y' luminance parameter. To avoid determining parameters based on unpermitted S' and T' parameters, the value of the Y' parameter from Y pixel row storage unit 601 is applied to max(imum) S' table unit 631, min(imum) S' table unit 632, max T' table unit 633 and to min T' table unit 634. The output signals from table units 631 and 632 establish the range of allowable values for S' and are applied to the S' select unit and insure that the parameter in S' select unit 608 is within the allowable range. The table units 633 and 634 similarly determine the allowable range of values for T' and insure that the parameter stored in the T' select unit 609 is within the allowable range.

In FIG. 6A and FIG. 6B, the position of the current pixel location is designated in pixel identification unit 627. The multiplexer units 608 and 607 are controlled by the subarray column and row identification unit 628. By using the multiplexer unit, the chrominance parameters for all cases are determined, but only the appropriate parameter transmitted for further processing. As in the encoding of the color parameters described in FIGS. 1–3, the use of look-up tables avoids the need for a multiply operation. The parameter length (8 bits) can be easily accommodated by look-up table procedure with a substantial increase in operation speed. The number of constants is similarly limited because of the symmetry of the pixel locations relative to the subarray pixel locations.

The transformation procedure of the preferred embodiment, while reducing the storage requirements for an image has the result that chromatic definition in the image is reduced. For images such as pictures, the reduction in definition is not objectionable. However, in situations where the definition is important, such as in line graph images, the image blurring can be unacceptable. To accommodate this image requirement, a storage location can be associated with each array or subarray pixel location and a signal in that storage location results in the interpretation of the luminance parameter as one of a predetermined group of colors. The luminance parameter can be applied to a random access memory, the parameter causing an RGB color parameter group to be available without additional processing.

2. Operation of the Preferred Embodiment

The present invention reduces the amount of information required to represent a color image by systematically providing, at periodic pixel subarray locations, a value for the two chrominance parameters that are weighted averages of these parameters at pixels surrounding the pixel subarray locations. Similarly, when the luminance/chrominance parameters are converted to the color parameters, a weighted value of the two processed chrominance parameters at neighboring pixel subarray locations are used to reconstruct (approximately) the original color parameters. The process is somewhat more complicated at the boundaries of the image where the general procedure would require quantities from points that are not in the image.

The conversion process in either direction is expedited by using RAM memories as look-up tables to eliminate the requirement for a multiplication operation. The number of the required RAM memories is reduced by observing the symmetries of the weighting process. In addition, the limited possible number of parameter values (i.e., 256 values for 8 bit parameters) contributes to the ability to replace the multiplication operation by a table addressing (look-up) operation.

It will be clear that the use of the subarray of the preferred embodiment of every fourth row pixel and every fourth column pixel is not a requirement. Other subarrays could be employed to achieve the same benefits in the reduction of information required to store an image. The periodicity of the subarray with respect to the image array permits the use of shift registers to allow associated pixel parameters to be placed in a location for processing.

The luminance/chrominance parameters are well defined intermediate parameters. However, it will be clear that the invention will effectively reduce the information required to reproduce an image when the intermediate parameters are the result of a more general transformation from the color parameters to the intermediate parameters.

The information reduction represent an image of the present invention has two complications for which provision must be made. In the color parameter to intermediate parameter transformation, the diminished number of pixel locations for subarray locations close to the boundary must have a special provision made to insure that non-representative value are not developed. In the intermediate parameter to color parameter transformation, the fact that the chrominance parameters are averaged quantities while the luminance parameter is the true value at a pixel can result in erroneous reconstruction color parameters. The luminance parameter implies that the two chrominance parameters must fall within a predetermined range. Therefore, the apparatus of the present invention includes a network that determines the allowable chrominance parameters for a given luminance parameter and insures that the chrominance parameters used in reconstructing the color parameters fall within the allowable range.

The present invention produces an averaging effect for color parameters that is generally not noticeable. However, for regions requiring sharp contrast such as a line display or a line through an image, the blurring effect can be unacceptable. To provide a region of high color contrast, a signal storage unit can be associated with each pixel. When a signal is in the storage unit, the luminance parameter for that pixel is replaced by a signal group that designates a color parameter combination. When the color parameters are reconstructed, the presence of the signal causes the associated pixel to have the designated color parameter location associated therewith.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for converting a color image represented by an array of pixels having color parameters associated with each array pixel into chrominance/luminance parameters for said array of pixels, said array of pixels including subarray pixels forming a subarray of pixels, said apparatus comprising:
   first means for converting said color parameters associated with said each array pixel to a first luminance/chrominance parameter associated with said each array pixel;
   second means for converting said color parameters associated with said each array pixel into a combined second luminance/chrominance parameter for each subarray pixel,; and
   third means for converting said color parameters associated with said each array pixel into a combined third luminance/chrominance parameter for said each subarray pixel.

2. The image converting apparatus of claim 1 wherein said luminance/chrominance parameters include a luminance parameter and a first and a second chrominance parameter, wherein said combined second luminance/chrominance parameter for said each subarray pixel is a combination of said first chrominance parameter determined by said first means for said each subarray pixel and related pixels in a neighborhood of said each subarray pixel, and wherein said combined third luminance/chrominance parameter for said each subarray pixel is a combination of said second chrominance parameter for said each subarray pixel and said related pixels.

3. The image converting apparatus of claim 2 wherein said second and third means includes apparatus for combining said first and said second chrominance parameters, respectively, of said each subarray pixel and said related pixels after multiplying said first and second chrominance parameters by a two dimensional Gaussian weighting function.

4. The image converting apparatus of claim 2 further comprising a storage location associated with said each array pixel, a first signal in each said storage location causing an associated array pixel luminance parameter to be processed as color parameters.

5. The image converting apparatus of claim 1 wherein said first means, said second means and said third means include respective apparatus for multiplying each color parameter of said color parameters by preselected constant factors, said respective apparatus for multiplying including table means for performing multiplication operations with table addressing operations of stored quantities.

6. In an image reproduction system in which the image color information is encoded as a luminance parameter associated with each array pixel of an array of pixels comprising said image and is encoded as first and second chrominance parameters associated with each subarray pixel of a subarray of pixels of said pixel array, wherein said each array pixel has at least one predetermined subarray pixel related thereto, apparatus for redetermining color parameters, said apparatus comprising:

first means responsive to said first and said second chrominance parameters of said at least one predetermined subarray pixel for determining a first and a second reconstructed chrominance parameter for said each array pixel; and second means responsive to said luminance parameter and said first and second reconstructed chrominance parameters associated with said each array pixel for determining three color parameters associated with said each array pixel.

7. The apparatus for redetermining color parameters of claim 6 further comprising limit means associated with said second means to limit values of said first and second reconstructed chrominance parameters to a range determined by an associated luminance parameter.

8. The apparatus for redetermining color parameters of claim 7 where said first means includes apparatus using said first and said second chrominance parameters of a subarray pixel as said first and said second reconstructed chrominance parameters of an array pixel when said subarray pixel and said array pixel are identical pixel locations.

9. The apparatus for redetermining color parameters of claim 6; wherein said first and said second means include respective multiplication apparatus for multiplying said luminance, said first chrominance, said second chrominance, said first reconstructed chrominance and said second reconstructed chrominance parameters by preselected constant values; said apparatus for respective multiplication including table means storing selected constant values for performing said multiplying with an addressing of said selected constant values.

10. A color image system in which a color image has associated therewith a set of points or pixels, each pixel having associated therewith three color parameters, wherein a display unit responsive to said pixel three color parameters can reproduce said color image, said color image system comprising:

first means responsive to said pixel three color parameters for providing three transformation parameters, each of said transformation parameters being a combination of said three color parameters, a first transformation parameter for said each pixel being determined by said three color parameters associated with said each pixel, a second transformation parameter for each subset pixel of a subset of said pixels being determined from said three color parameters for each pixel of a group of pixels having a predetermined relationship with said each subset pixel, said second transformation parameter for said each subset pixel being a first combination of said pixel color parameters for pixels having said predetermined relationship with said each subset pixel; and second means responsive to said first transformation parameters of each pixel and said second transformation parameter of said each subset pixels for providing three said color parameters for each of said pixels of said set.

11. The color image system of claim 10 wherein a third transformation parameter is determined by said first means for said each subset pixel from said three color parameters for each pixel of a group of pixels having said predetermined relationship with said each subset pixel, said third transformation parameter for each subset pixel being a second combination of said pixel color parameters for pixels having a predetermined relationship with said each subset pixel.

12. The color image system of claim 10 wherein said first and said second means include respective apparatus for multiplying pixel parameters by preselected constant values, said respective apparatus for multiplying including table means storing selected constant values for implementing said multiplying by selectively addressing said selected constant values.

13. The color image system of claim 11 wherein said first means includes apparatus for multiplying said second and third transformation parameters by a normalized Gaussian weighting function for color parameters associated with pixels having a predetermined relationship with said associated subset pixel.

14. The color image system of claim 10 wherein said second means includes:

combination means for determining three reconstructed transformation parameters for each pixel of said set; and limit means for restricting a second and a third reconstructed transformation parameters to values determined by a first reconstructed transformation parameter, wherein said second means combines said three reconstructed transformation parameters for each pixel of said set to provide said three color parameters for said each pixel of said set.

15. The color image system of claim 10 further comprising a signal storage means associated with said each pixel, a preselected signal in said storage means causing said first transformation parameter associated with said pixel to be processed as a preestablished color parameter.

16. The color image system of claim 11 wherein said first transformation parameter is a luminance parameter and said second and third transformation parameters are chrominance parameters.

17. The color image of claim 10 wherein said image pixel set is arranged in lines and rows, said subset being every Nth pixel of every Mth row.

18. The method of reducing the number of parameters required to describe an image, the image being represented by an array of pixels, each array pixel having three color parameters associated therewith, said method comprising the steps of:

using said three color parameters to establish a luminance parameter for said each array pixel;

selecting a subarray of pixels, each subarray pixel of said subarray of pixels having a plurality of related array pixels;

using said three color parameters to establish a first chrominance parameter for said each array pixel; and determining a first combined chrominance parameter for said each subarray pixel, said first combined chrominance parameter of said each subarray pixel being a weighted average of first chrominance parameters for said related array pixels.

19. The image parameter reduction method of claim 18 further comprising the step reconstructing said first chrominance parameter for said each array pixel, a reconstructed first chrominance parameter resulting from a combination of subarray pixel first combined chrominance parameters of at least one subarray pixel associated with said each array pixel.

20. The image parameter reduction method of claim 18 further comprising the steps of:

using said three color parameters to establish a second chrominance parameter for said each array pixel; and determining a second combined chrominance parameter for said each subarray pixel, said second combined chrominance parameter of said each subarray pixel being said weighted average of second chrominance parameters for said related array pixels.

21. The image parameter reduction method of claim 20 further comprising the step of reconstructing said second chrominance parameter for said each array pixel, said reconstructed second chrominance parameter being a combination of second combined chrominance parameters for at least one subarray pixel associated with said each array pixel.

22. The image parameter reduction method of claim 19 further comprising the step of limiting said reconstructed chrominance parameter to a range of values determined by said luminance parameter associated with said each array pixel.

* * * * *